(12) United States Patent
Schropp et al.

(10) Patent No.: US 8,186,173 B2
(45) Date of Patent: May 29, 2012

(54) REFRIGERATOR UNIT AND/OR FREEZER UNIT

(75) Inventors: Christian Schropp, Attenhausen (DE); Klaus Oelmaier, Ochsenhausen (DE)

(73) Assignee: Liebherr-Hausgeräte Ochsenhausen GmbH, Ochsenhausen (DE)

( * ) Notice: Subject to any disclaimer, the term of this patent is extended or adjusted under 35 U.S.C. 154(b) by 548 days.

(21) Appl. No.: 12/317,619

(22) Filed: Dec. 24, 2008

(65) Prior Publication Data

US 2010/0011790 A1    Jan. 21, 2010

(30) Foreign Application Priority Data

Dec. 28, 2007  (DE) ............ 20 2007 018 135 U
Jan. 18, 2008  (DE) ............ 20 2008 000 757 U

(51) Int. Cl.
*F25D 21/00* (2006.01)
*F25B 49/00* (2006.01)

(52) U.S. Cl. ............................ 62/234; 62/176.2

(58) Field of Classification Search ............. 62/186, 62/408, 419, 234, 176.2, 176.6
See application file for complete search history.

(56) References Cited

U.S. PATENT DOCUMENTS

| 5,791,152 A | 8/1998 | Choi | |
| 6,725,680 B1* | 4/2004 | Schenk et al. | 62/186 |
| 7,765,818 B2* | 8/2010 | Buck | 62/180 |
| 2004/0187503 A1* | 9/2004 | Davis et al. | 62/180 |

FOREIGN PATENT DOCUMENTS

| DE | 102 35 783 | | 3/2004 |
| DE | 103 26 329 | | 12/2004 |
| DE | 698 31 028 | | 5/2006 |
| JP | 08271105 A | * | 10/1996 |
| WO | WO 2006049355 A1 | * | 5/2006 |

OTHER PUBLICATIONS

Hydraulik in Theorie und Praxis, Von Bosch. Robert Bosch GmbH Stuttgart 1983, pp. 218-219.

* cited by examiner

*Primary Examiner* — Chen Wen Jiang
(74) *Attorney, Agent, or Firm* — Dilworth & Barrese, LLP.

(57) ABSTRACT

The present invention relates to a no-frost refrigerator unit and/or freezer unit comprising a fan for the generation of an airflow in a compartment of the unit to be cooled, wherein the unit comprises detection means for the detection of at least one parameter as well as a control or regulation unit which is made such that it varies the speed of the fan in dependence on the at least one measured parameter.

21 Claims, No Drawings

REFRIGERATOR UNIT AND/OR FREEZER UNIT

BACKGROUND OF THE INVENTION

The present invention relates to a no-frost refrigerator unit and/or a freezer unit comprising a fan for the generation of an airflow in the compartment to be cooled.

So-called no-frost refrigerator units and/or freezer units are known from the prior art in which frosting of the compartment to be cooled is substantially prevented in that a fan is associated with the evaporator of the unit, said fan providing air circulation in the space to be cooled and over the evaporator.

SUMMARY OF THE INVENTION

It is the underlying object of the present invention to further develop a refrigerator unit and/or a freezer unit of the initially named kind such that it can be operated with greater flexibility with respect to previously known units.

This object is solved by a refrigerator unit and/or a freezer unit having the features herein. Provision is accordingly made for the unit to have detection means for the detection of at least one parameter as well as to have a control or regulation unit which is made such that it controls or regulates the speed of the fan in dependence on the at least one measured parameter. In accordance with the invention, the speed of the fan is varied in dependence on one or more measured variables, i.e. the fan is not operated permanently at a constant speed.

The fan is preferably a speed-regulated fan.

In accordance with the invention, it is possible to adapt the air volume flow generated by the fan to the respectively required refrigerating power. If there is only a small refrigerating requirement, the fan speed can be reduced, whereby the noise development is also simultaneously reduced which is caused by the operation of the fan as well as by the airflow caused by it. Furthermore, the power consumption of the fan and thus also the energy consumption of the unit also becomes smaller.

If, in contrast, there is a comparatively high refrigeration requirement, such as is the case at high ambient temperatures, a higher refrigeration power can be provided by increasing the fan speed. This permits the use of a compressor having a low refrigeration capacity.

In accordance with the invention, the optimum fan speed can thus be determined and set for every operating state with respect to noise development and energy consumption. It is conceivable to determine the fan speed from stored values which associate a fan speed or a speed range of the fan with a parameter or with a set of parameters. It is also possible that the fan speed is correlated with the parameter or parameters via one or more functions so that a suitable fan speed can be determined and then set when the parameter or parameters is/are known.

The detection means can be made such that they measure one or a plurality of operating parameters of the unit.

The at least one operating parameter can, for example, be the compressor speed and/or the running times and idle times of the compressor and/or the relative switch-on duration of the compressor. It is, for example, conceivable that in conjunction with a speed-regulated compressor, the speed of the fan is regulated in dependence on the compressor speed. It is also conceivable that the fan speed is set or regulated in dependence on the running times and idle times or on the relative switch-on during of the compressor.

The at least one operating parameter can furthermore be the setting of the temperature regulator of the unit. If the temperature regulator of the unit is set to a high value, that is, if a high refrigeration capacity is required, provision can be made that the fan speed is set comparatively high until the temperature is reached, or even for longer. If, in contrast, a lower regulator setting is selected, that is, if only a low refrigeration requirement is demanded, provision can be made that the fan is operated at a comparatively low speed.

In a further embodiment of the invention, the at least one operating parameter is the temperature and/or the temperature change or its speed and/or the humidity and/or the humidity change of the space of the unit to be cooled. If a hot product is placed into the compartment to be cooled, a comparatively fast temperature increase can occur which brings about a relatively high fan speed.

Provision is made in a further embodiment of the invention that the speed of the fan depends on the operating state of the unit. If, for example, the unit is in the defrosting phase, provision can be made that the fan speed is increased for a specific duration of time or for the duration of time of the defrosting phase and that subsequently the fan is again operated at the rated speed.

The parameter in dependence on which a setting of the fan speed takes place can be the number of times the door is opened or the time the door is opened. If the door of the unit is opened relatively frequently or for long times, a comparatively large heat input into the compartment to be cooled can be assumed. Provision can be made in these cases to set the fan speed correspondingly high.

The detection means can alternatively or additionally also be made such that they do not detect parameters directly relating to the unit, but rather parameters of the ambient atmosphere. For example, the detection of the ambient temperature and/or of the relative humidity of the unit environment is conceivable. It is conceivable to operate the fan at a low speed at a low ambient temperature and/or at low humidity of the ambient atmosphere and to operate it at a correspondingly higher speed at a higher ambient temperature or humidity of the ambient atmosphere to satisfy the increased refrigeration demand in the case of a higher ambient temperature.

It is pointed out at this point that the term "door" is not to be interpreted restrictively to the effect that only units having a closure element pivotable around a vertical axis are covered. Drawers or flaps are also to be understood by this term.

Further details and advantages of the invention will be explained in more detail with reference to the embodiment described in the following:

The refrigerator unit and/or freezer unit has a compressor, a no-frost evaporator as well as a fan which is arranged such that it generates airflow in the compartment to be cooled and over the evaporator.

The unit furthermore comprises detection means by means of which one or more parameters relating to the unit or also to the unit environment can be detected. A control and/or regulation unit is furthermore provided which controls the fan accordingly based on the parameters detected.

If, for example, the parameter "ambient temperature" is detected, provision can be made that the fan is operated at a low speed at a low ambient temperature and is operated at a comparatively high speed at a high ambient temperature due to the higher required refrigeration capacity.

If the parameter "compressor speed" is measured, the fan speed can be regulated in dependence on the compressor speed, in particular in conjunction with a speed-regulated compressor.

If, for example, the parameter "running times and idle times of the compressor" is measured, a corresponding fan speed can be used in dependence on this parameter. The same applies accordingly to the parameter "relative switch-on duration of the compressor".

It is also possible to measure the number and/or the duration of the times the door or flap is opened and to select the fan speed in dependence on this number and/or on the duration. If the door is opened a large number of times or for long times, this results in an increased heat input into the space to be cooled. In this case, the speed of the fan is increased accordingly to be able to provide the increased refrigeration capacity.

A further parameter can be the "regulator setting". The fan speed can be set in dependence on the regulator setting set by the user. With a "warm regulator setting", i.e. with a low refrigeration capacity, the fan can be operated at a low speed and with a "cold regulator setting", i.e. at a high refrigeration capacity, the fan can be operated at a high speed.

It is also conceivable to detect the operating state to the effect whether the unit is in a defrosting phase. It is conceivable to increase the fan speed for a specific time duration before and directly after a defrosting phase. The unit can subsequently again be operated at the rated speed.

A further parameter is the temperature increase in the unit. In this case, it is not the temperature value per se which is detected, but rather the speed at which the temperature value changes. If, for example after one or more door openings, there is a fast temperature increase in the unit, the blower speed is increased.

It is also conceivable to vary the speed of the fan in dependence on the relative humidity.

It becomes possible by the present invention to adapt the speed of a speed-regulated fan and thus the air volume flow generated by it to the respectively required refrigeration capacity. An optimum fan speed can be determined for every operating state of the unit with respect to noise development, energy consumption and refrigeration capacity and can then be set by control or regulation.

The invention claimed is:

1. A no-frost refrigerator unit and/or freezer unit comprising a fan for the generation of an airflow in a compartment of the unit to be cooled, wherein
   the unit comprises detection means for the detection of at least one parameter as well as a control or regulation unit which is made such that it varies the speed of the fan in dependence on the at least one measured parameter,
   the at least one measured parameter is an operating state of the no-frost refrigerator and/or freezer unit, with the operating state including the states "defrosting phase" and "normal operation," and
   the fan speed is controlled to increase for a specific time duration before and directly after the defrosting phase.

2. A refrigerator unit and/or a freezer unit in accordance with claim 1, wherein the detection means are made such they measure the operating state including one or more operating parameters of the unit.

3. A refrigerator unit and/or a freezer unit in accordance with claim 2, wherein the at least one operating parameter includes the speed of a compressor and/or the running times and idle times of the compressor and/or the relative switch-on duration of the compressor.

4. A refrigerator unit and/or a freezer unit in accordance with claim 3, wherein the at least one operating parameter includes the setting of the temperature regulator of the unit.

5. A refrigerator unit and/or a freezer unit in accordance with claim 4, wherein the at least one operating parameter includes the temperature and/or the temperature change and/or the humidity and/or the humidity change of the space of the unit to be cooled.

6. A refrigerator unit and/or a freezer unit in accordance with claim 5, wherein the at least one parameter includes the change speed of the temperature and/or of the humidity of the space of the unit to be cooled.

7. A refrigerator unit and/or a freezer unit in accordance with claim 4, wherein the at least one parameter is the change speed of the temperature and/or of the humidity of the space of the unit to be cooled.

8. A refrigerator unit and/or a freezer unit in accordance with claim 3, wherein the at least one operating parameter includes the temperature and/or the temperature change and/or the humidity and/or the humidity change of the space of the unit to be cooled.

9. A refrigerator unit and/or a freezer unit in accordance with claim 8, wherein the at least one parameter includes the change speed of the temperature and/or of the humidity of the space of the unit to be cooled.

10. A refrigerator unit and/or a freezer unit in accordance with claim 2, wherein the at least one operating parameter includes the setting of the temperature regulator of the unit.

11. A refrigerator unit and/or a freezer unit in accordance with claim 10, wherein the at least one operating parameter includes the temperature and/or the temperature change and/or the humidity and/or the humidity change of the space of the unit to be cooled.

12. A refrigerator unit and/or a freezer unit in accordance with claim 11, wherein the at least one parameter includes the change speed of the temperature and/or of the humidity of the space of the unit to be cooled.

13. A refrigerator unit and/or a freezer unit in accordance with claim 10, wherein the at least one parameter includes the change speed of the temperature and/or of the humidity of the space of the unit to be cooled.

14. A refrigerator unit and/or a freezer unit in accordance with claim 2, wherein the at least one operating parameter includes the temperature and/or the temperature change and/or the humidity and/or the humidity change of the space of the unit to be cooled.

15. A refrigerator unit and/or a freezer unit in accordance with claim 2, wherein the at least one parameter includes the change speed of the temperature and/or of the humidity of the space of the unit to be cooled.

16. A refrigerator unit and/or a freezer unit in accordance with claim 2, wherein the at least one operating parameter includes the number and/or the duration of times the door and/or flap and/or drawer is opened.

17. A refrigerator unit and/or a freezer unit in accordance with claim 2, wherein the at least one operating parameter includes the temperature and/or the temperature change and/or the humidity and/or the humidity change of the space of the unit to be cooled.

18. A refrigerator unit and/or a freezer unit in accordance with claim 17, wherein the at least one parameter includes the change speed of the temperature and/or of the humidity of the space of the unit to be cooled.

19. A refrigerator unit and/or a freezer unit (6) in accordance with claim 1, wherein detection means are made such that they detect the ambient temperature and/or the humidity of the unit environment.

20. A refrigerator unit and/or a freezer unit in accordance with claim 1, wherein the control or regulation unit additionally determines the fan speed from stored values which associate a fan speed or a speed range of the fan with a parameter or set of parameters.

21. A refrigerator unit and/or a freezer unit in accordance with claim 20, wherein the control or regulation unit additionally correlates the fan speed with the parameter or set of parameters via one or more functions such that a suitable fan speed is determined with the parameter or parameters is/are known.

* * * * *